United States Patent
Ono et al.

(10) Patent No.: US 7,060,378 B2
(45) Date of Patent: Jun. 13, 2006

(54) POLYESTER FILM FOR MAGNETIC RECORDING MEDIA, MAGNETIC RECORDING TAPE AND DIGITAL RECORDER

(75) Inventors: Masaaki Ono, Otsu (JP); Katsuya Okamoto, Otsu (JP); Kazuyoshi Fukata, Kusatsu (JP)

(73) Assignee: Toray Industries, Inc., Tokyo (JP)

( * ) Notice: Subject to any disclaimer, the term of this patent is extended or adjusted under 35 U.S.C. 154(b) by 61 days.

(21) Appl. No.: 10/372,195

(22) Filed: Feb. 25, 2003

(65) Prior Publication Data

US 2003/0162056 A1    Aug. 28, 2003

(30) Foreign Application Priority Data

| Feb. 26, 2002 | (JP) | ............................. 2002-049604 |
| May 30, 2002 | (JP) | ............................. 2002-157378 |

(51) Int. Cl.
 *G11B 5/66* (2006.01)
 *G11B 5/70* (2006.01)

(52) U.S. Cl. .................................................. 428/847.7

(58) Field of Classification Search ................ 428/323, 428/692, 694, 694 TM, 694 B, 694 BS, 694 SG, 428/847.7, 848.2
See application file for complete search history.

(56) References Cited

U.S. PATENT DOCUMENTS 4,568,600 A    2/1986  Ono et al. ................... 428/145
4,732,814 A *  3/1988  Hatada et al. .............. 428/480

FOREIGN PATENT DOCUMENTS

| EP | 0 504 416 A1 | 9/1992 |
| EP | 0 548 904 A1 | 6/1993 |
| EP | 0 916 484 A1 | 5/1999 |
| EP | 0916484 A1 * | 5/1999 |
| EP | 0959097 A1 * | 5/1999 |
| EP | 0 959 097 A2 | 11/1999 |
| JP | 63-57238 B2 | 11/1988 |
| JP | 6-99579 B2 | 12/1994 |
| JP | 2000-25105 A | 1/2000 |
| JP | 2002-50028 A | 2/2002 |

* cited by examiner

Primary Examiner—Holly Rickman
(74) Attorney, Agent, or Firm—Kubovcik & Kubovcik

(57) ABSTRACT

A polyester film for magnetic recording media includes a coating layer containing fine particles and organic compounds formed on surface A at one side of the polyester film, and fine surface protrusions formed at a density of $3 \times 10^6$ to $1 \times 10^8$ protrusions/mm$^2$ on surface A. The polyester film satisfies at least one of the following conditions: (a) the mean diameter of the fine surface protrusions is in the range of 5 to 60 nm, and, among the fine surface protrusions, the density of fine surface protrusions with a height of 20 nm or more is 3,000 protrusions/mm$^2$, and (b) the mean diameter of the fine surface protrusions is in the range of 5 to 100 nm, the mean height of the fine surface protrusions is in the range of 5 to 30 nm, and the degree of cohesion of the fine surface protrusion is less than 15%.

4 Claims, No Drawings ced in the autumn of 2001 for use with lightweight and
POLYESTER FILM FOR MAGNETIC RECORDING MEDIA, MAGNETIC RECORDING TAPE AND DIGITAL RECORDER

BACKGROUND OF THE INVENTION

1. Field of the Invention

The present invention relates to a magnetic recording tape, in particular to a polyester film suitable for producing a magnetic recording tape of a ferromagnetic metal thin film such as a digital video cassette tape and data storage tape, in which data can be stored and reproduced with an MR head. The present invention also relates to a magnetic recording tape produced using the polyester film, and to a digital recorder.

2. Description of the Related Art

Domestic digital video cassette tapes (referred to as DVC tapes hereinafter) that have been in practical use since 1995 comprise a thin magnetic metal layer of Co with a thickness of 6 to 7 μm provided by vacuum evaporation on a base film, and a diamond-like carbon film coated on the magnetic thin film. A DV mini-cassette has a recording capacity that can record SD (Standard Definition) images for one hour.

The DVC tapes were developed as the first domestic digital video cassette in the world, and have been commercially successful due to the following advantages:

a. large storage capacity despite their small size;

b. good image quality and tone quality for many years since signals are not deteriorated;

c. high image quality and high tone quality without suffering from noise; and d. no deterioration of image quality after repeated dubbing.

A polyester film having a surface coated with fine particles and a polymer has been used as the base film of the DVC tapes (for example, Japanese Examined Patent Publication Nos. 63-57238 and 6-99579, and Japanese Unexamined Patent Application Publication No. 2002-50028).

However, the so-called MICRO-MV standard was introduced in the autumn of 2001 for use with lightweight and compact video cameras, wherein one hour of video recording is possible using a cassette having a volume as small as 30% of the DV mini-cassette. While this new video standard is based on the digital recording method using a vacuum evaporation tape, as in the DVC standard, the picture compression method was changed from the DV compression (DVC standard) to MPEG2 compression, and the tape width was reduced from 6.35 mm (DVC standard) to 3.8 mm. In addition, the minimum recording wavelength was reduced to 0.29 μm from 0.49 μm (DVC standard), and the track pitch was reduced to 5 μm from 10 μm (DVC standard) and 6.7 μm (DVLP standard), meaning that the recording density was significantly increased. Furthermore, the thickness of the magnetic layer was significantly reduced to 50 nm in the MICRO-MV tape as compared with the thickness of 160 to 220 nm in the DVC tape.

Such high density recording and reproduction were enabled because MR heads (magnetoresistive heads) used in hard disk drives were employed for reproduction. MR heads take advantage of a phenomenon in which the electrical resistance of a metal thin film formed on a MR head changes in accordance with the changes of the applying magnetic field.

However, since the metal thin film provided on the MR head is as thin as 20 nm, it is readily worn down by allowing it to travel in contact with the magnetic recording tape.

Accordingly, when the MICRO-MV tape is produced by using a conventional film used as the DVC tape base film, there is a problem in that the MR head needs to be frequently replaced due to the extremely short service life of the MR head (a continuous reproduction time of about 100 hours).

SUMMARY OF THE INVENTION

An object of the present invention is to provide a magnetic recording tape that produces little wear of the MR head and has good traveling durability with a low incidence of dropouts, and a base film that enables such a magnetic recording tape to be produced.

The present invention provides a polyester film for magnetic recording media comprising a coating layer containing fine particles and organic compounds formed on surface A at one side of the polyester film, and fine surface protrusions formed in a density of $3 \times 10^6$ to $1 \times 10^8$ protrusions/mm$^2$ on surface A. The polyester film satisfies at least one of the following conditions: (a) the mean diameter of the fine surface protrusions is in the range of 5 to 60 nm, and, among the fine surface protrusions, the density of fine surface protrusions with a height of 20 nm or more is 3,000 protrusions/mm$^2$ or less; and (b) the mean diameter of the fine surface protrusions is in the range of 5 to 100 nm, the mean height of the fine surface protrusions is in the range of 5 to 30 nm, and the degree of cohesion of the fine surface protrusions is less than 15%.

The present invention also provides a magnetic recording tape comprising a thin ferromagnetic metal layer provided on the coating layer on surface A of the polyester film.

The present invention also provides a digital recorder comprising at least a reproduction head and magnetic recording tape, wherein an MR head as the reproduction head and the magnetic recording tape are used for a digital recording method.

DESCRIPTION OF THE PREFERRED EMBODIMENTS

On the polyester film for magnetic recording media according to the present invention (referred to as a base film hereafter), fine surface protrusions are formed by forming a coating layer containing fine particles and organic compounds on one surface (referred to as surface A hereinafter) of the substrate polyester film. The magnetic recording media, such as magnetic recording tapes, are produced by forming a thin metal ferromagnetic layer (referred to as a magnetic layer hereinafter) on surface A by vacuum evaporation. Surface A refers to the surface of the coating layer containing the fine particles and organic compounds in the present invention, unless otherwise stated.

The inventors of the present invention have found, through intensive studies, that wear of the MR head by the magnetic recording tape produced from a base film is reduced by controlling the base film to have fine surface protrusions on surface A of the base film with a specified size and density, in addition to improving the traveling durability of the tape.

The density of the fine surface protrusions on surface A of the base film is $3 \times 10^6$ to $1 \times 10^8$ protrusions/mm$^2$, preferably $5 \times 10^6$ to $9 \times 10^7$ protrusions/mm$^2$, more preferably $5 \times 10^6$ to $8 \times 10^7$ protrusions/mm$^2$, and most preferably $9 \times 10^6$ to $6 \times 10^7$ protrusions/mm$^2$.

The traveling durability of the magnetic recording tape is reduced if the surface of the magnetic layer of the magnetic recording tape is too smooth, that is, when the density of fine surface protrusions is smaller than $3 \times 10^6$ protrusions/mm$^2$. On the other hand, the frequency of dropouts tends to be increased if the roughness of the surface of the magnetic layer of the tape is too large, that is, when the density of the fine surface protrusions is larger than $1 \times 10^8$ protrusions/mm$^2$. Dropout as used herein refers to as a phenomenon in which image defects are caused by a missing part of the signals due to poor reproducibility of the signals.

In one embodiment of the invention, the diameter of the fine surface protrusions is in the range of 5 to 60 nm. Of the fine surface protrusions, the density of those fine surface protrusions with a height of 20 nm or more is 3,000 protrusions/mm$^2$ or less, and preferably 1200 protrusions/mm$^2$ or less.

A mean diameter of the fine surface protrusions of less than 5 nm is not preferable in this embodiment, since the traveling durability of the magnetic recording tape would be reduced due to an excessive smoothness of the surface of the magnetic layer of the magnetic recording tape. A mean diameter of the fine surface protrusions of larger than 60 nm is also not preferable, since the incidence of dropouts tends to be increased due to an excessive surface roughness of the magnetic layer of the magnetic recording tape.

The fine surface protrusions permit adverse effects of friction on the magnetic head during recording or reproduction to be reduced. However, since protrusions with a height of 20 nm or more cause additional noise in the electrical signals reproduced by the MR head, it is preferable to reduce the number of surface protrusions with a height of 20 nm or more. In addition, since the magnetic recording tape compatible with the MR head has a magnetic layer with a thickness about one third the thickness of the conventional DVC tape, the surface protrusions of the base film are readily reflected in the shape of the surface protrusions of the magnetic layer. Excessive surface protrusions on the surface of the magnetic layer cause the surface of the MR head to be worn down when the tape travels in contact with the MR head. Accordingly, the density of the surface protrusions having a height of 20 nm or more on the surface of the coating layer of the base film is suppressed to be 3,000 protrusions/mm$^2$ or less. The preferable density of the fine surface protrusions with a height of 20 nm or more is 1200 protrusions/mm$^2$ or less.

It is difficult to realize the object of the present invention when the density of the fine surface protrusions with a height of 20 nm or more is larger than 3,000 protrusions/mm$^2$, because the proportion of noise components in the reproduction signals read out with the MR head increases to cause frequent dropouts and wear of the MR head is also likely.

In another embodiment of the invention, the mean diameter (D) of the fine surface protrusions is in the range of 5 to 100 nm, preferably in the range of 20 to 100 nm, and more preferably in the range of 22 to 80 nm, and the mean height (H) of the fine surface protrusions is in the range of 5 to 30 nm, preferably in the range of 10 to 30 nm, and more preferably in the range of 12 to 25 nm. The degree of cohesion of the fine surface protrusions is less than 15%, preferably less than 10%, further more preferably less than 5%, and most preferably less than 2%.

When the mean diameter (D) of the fine surface protrusions is smaller than 5 nm in this embodiment, hardly any fine protrusions appear on the surface of the magnetic recording tape, and the traveling durability decreases. On the other hand, when the mean diameter (D) is larger than 100 nm, the diameter of the fine surface protrusions appearing on the surface of the magnetic layer becomes so large that the incidence of dropouts tends to be increased.

The traveling durability decreases when the mean height (H) of the fine surface protrusions is smaller than 5 nm, because the surface protrusions do not appear with a sufficient density on the surface of the magnetic layer formed on the base film. On the other hand, the incidence of dropouts tends to be increased when the mean height (H) of the fine surface protrusions is larger than 30 nm, because the height of the surface protrusions appearing on the surface of the magnetic layer formed on the base film becomes too large.

It is preferable that the ratio (H/D) of the mean height (H) to the mean diameter (D) of the fine surface protrusions be smaller than 1.0. The ratio H/D is preferably 0.9 or less, and more preferably 0.8 or less. Since the shape of the fine surface protrusions is not so steep, the shape of the surface protrusions appearing on the surface of the magnetic layer formed on the surface of the base film also becomes gentle. Consequently, the surface of the MR head is not worn down by the protrusions on the surface of the magnetic layer during reproduction of the magnetic recording tape.

Preferably, the fine surface protrusions are not grouped together. The degree of cohesion of the fine surface protrusions is preferably less than 15%, more preferably less than 10%, further more preferably less than 5%, and most preferably less than 2%. The term "degree of cohesion of the fine surface protrusions" as used herein refers to the proportion of the number of fine surface protrusions in close contact with other fine surface protrusions to the number of all the fine surface protrusions. The phrase "in close contact with other fine surface protrusions" means that a surface fine protrusion is in contact with another fine surface protrusion, or another fine surface protrusion lies within $\frac{1}{10}$ length of the principal axis of the fine surface protrusion in question.

When the degree of cohesion of the fine surface protrusions is 15% or more, grouped surface protrusions also tend to appear on the surface of the magnetic layer formed on the surface of the base film. The grouped surface protrusions appearing on the magnetic layer serve as a file, and the MR head is liable to be worn down. Accordingly, a lower degree of cohesion of the fine surface protrusions on the base film is more preferable. The degree of cohesion may be reduced to approximately 0.1% or less by sufficiently increasing the degree of dispersion of the fine particles.

The surface roughness Ra of the surface of the base film is preferably in the range of 1 to 5 nm, and more preferably in the range of 2 to 4 nm. A surface roughness Ra of less than 1 nm is not preferable, since the magnetic layer formed on surface A becomes so smooth that the magnetic layer of the magnetic recording tape tends to be readily worn by the magnetic head. On the other hand, a surface roughness Ra of larger than 5 nm is also not preferable, since the magnetic layer becomes so rough that the output characteristics of the magnetic recording tape tend to be deteriorated.

The thickness of the polyester film for the magnetic recording media according to the present invention is preferably less than 10 μm, and more preferably 3.5 to 9.0 μm.

While the polyester used for the film according to the present invention may be a polyester that can be reinforced by molecular orientation, polyethylene terephthalate or polyethylene-2,6-naphthalate is preferable among these polyesters. It is preferable that 80 mol % or more of the components of the polyethylene terephthalate or polyethylene-2,6-naphthalate comprises ethylene terephthalate units or ethylene naphthalate units. Examples of the copolymer components of the polyester other than ethylene terephthalate units or ethylene naphthalate units include diol components such as diethylene glycol, propylene glycol, neopentyl glycol, polyethylene glycol, p-xylylene glycol, and 1,4- cyclohexane dimethanol; dicarboxylic acid components such as adipic acid, sebacic acid, phthalic acid, isophthalic acid, and sodium 5-sulfoisophthalic acid; polyfunctional carboxylic acid components such as trimellitic acid and pyromellitic acid; and p-oxyethoxy benzoic acid.

Known additives can be added to the polyester. For example, the polyester may be mixed with at least one of sulfonic acid alkali metal derivatives that are not reactive with the polyester, and a polyalkylene glycol substantially insoluble to the polyester, up to 5% by weight.

The fine surface protrusions on surface A are provided by forming a coating layer containing fine particles and organic compounds on the surface of the polyester film. The mean particle diameter of the fine particles is preferably 5 to 60 nm. Examples of the preferable fine particles available include organic polymer particles comprising organic polymers such as polyacrylic acid, polystyrene, polyethylene, polyester, polyacrylic acid esters, polymethyl methacrylate, polyepoxy resins, polyvinyl acetate, acrylic-styrene copolymers, acrylic copolymers, various modified acrylic resins, styrene-butadiene copolymers, and various modified styrene-butadiene copolymers; and particles coated with an organic polymer using inorganic particles such as silica, alumina, and calcium carboxylate as core particles. Preferable organic polymers are self cross-linking organic polymers having terminal groups modified with epoxy, amine, carboxylic and hydroxyl groups. While inorganic particles such as silica and alumina particles may be used as the fine particles, the organic polymer particles are more preferable since fine surface protrusions having a smaller height relative to the diameter may be readily formed, which results in little wear of the MR head in addition to a soft surface property that results in little wear of the MR head.

Examples of the preferable organic compounds available for the coating layer include organic polymers such as polyvinyl alcohol, tragacanth gum, casein, gelatin, cellulose derivatives, water-soluble polyesters, polyurethane, acrylic-polyester resins, isophthalic acid ester resins, and methacrylic acid esters, and compounds selected from combinations of these polymers.

The content of the fine particles in the coating layer is preferably 0.5 to 12.0% by weight, more preferably 0.6 to 10.0% by weight.

The surface roughness Ra of the surface opposite to surface A of the base film (referred to as surface B hereinafter) is preferably 8 to 50 nm, and more preferably 10 to 45 nm. When the surface roughness Ra of surface B is larger than 50 nm, the magnetic layer may be deformed by swelling as a result of transfer of the surface roughness of surface B onto surface A when the polyester film is wound into a roll. On the other hand, when the surface roughness Ra of surface B is in the range as described above, a product having a good winding profile may be obtained when the polyester film is slit into a predetermined width. Good runnability of the tape in the digital recorder may also be attained when the film is processed into a magnetic recording tape.

One means for adjusting the surface roughness of surface B within the range described above is to provide on surface B a coating layer containing the fine particles larger than those in surface A and organic compounds. Another means is to laminate a polyester film containing fine particles larger than those in surface A onto surface B. These means may be used together. Examples of the fine particles include calcium carbonate, silica, alumina, and polystyrene particles. The mean particle diameter of the used fine particles is preferably 100 to 1,000 nm, more preferably 150 to 900 nm. The fine particle content is preferably in the range of 0.05 to 1.0% by weight, and more preferably in the range of 0.08 to 0.8% by weight. The same organic compounds as used in surface A may also be used for surface B.

Surface B is preferably subjected to a lubricating treatment in order to improve the runnability and durability of the tape against various guides and pins in the digital tape recorder, when the polyester film for the recording media according to the invention is used for a magnetic recording tape. While the lubricating treatment is not particularly restricted, it is preferable that the coating layer at the surface B side or the polyester film contains a lubricant, or to further provide a back-coat layer containing the lubricant on surface B. Available lubricants include those known in the art, such as silicone. The back-coat layer preferably has a thickness of 0.3 to 1.5 μm.

The magnetic recording tape according to the present invention is provided by forming the magnetic layer by vacuum evaporation on the coating layer on surface A of the polyester film for magnetic recording media of the invention, and by processing the film into a tape. While the metals to be used for the magnetic layer are not particularly restricted, they preferably comprise ferromagnetic materials such as iron, cobalt and nickel, or alloys thereof. The thickness of the magnetic layer is preferably in the range of 20 to 70 nm so that it is compatible with the MR head. It is not preferable that the thickness of the magnetic layer be smaller than 20 nm, since the reproduction output signal from the magnetic recording tape becomes too weak, thus making it difficult to read the recording signal. A thickness of the magnetic layer of larger than 70 nm is also not preferable, since the reproduction output signal would be so strong that the reproduction signal intensity of the MR head would be saturated, making it difficult to read the recorded data.

The magnetic recording tape according to the invention may be favorably used as a magnetic recording tape for the digital recorder using an MR head as the reproduction head. A digital recorder using the magnetic recording tape of the invention gives good results when used as a digital video recorder or a data storage device. Good images may be obtained due to the low incidence of dropouts when the magnetic recording tape is used in a digital recorder such as a MICRO MV digital video recorder in which the signals are recorded at an extremely high density with a track pitch of 6 μm or less on the magnetic recording tape, and regenerated with the MR head. Since the tape does not adversely affect the service life of the MR head and the traveling durability of the tape is good, the image is not deteriorated by repeated use.

An example of a method for producing the polyester film for magnetic recording media of the invention will be described below.

In a first step, a polyester film is obtained by extrusion using a polyester material from which included particles are removed as much as possible. Then, the film is stretched in a machine direction with a stretching ratio of 2.7 to 5.5 at a stretching temperature of 90 to 140° C.

A coating layer is formed on surface A of the polyester film after stretching in the machine direction by coating it with a coating solution containing fine particles and organic compounds.

The film having fine surface protrusions on surface A is stretched in the transverse direction with a stretching ratio of 3.5 to 7.0 at a stretching temperature of 90 to 140° C. After the biaxial stretching, the film is heat-set at a temperature of 190 to 220° C.

While, in the example above, the film was subjected to sequential biaxial stretching the film may be subjected to simultaneous biaxial stretching after coating the surface A of the film with the coating solution containing the fine particles and organic compounds before stretching. The film may be mechanically reinforced, if desired, by stretching again in the machine direction or transverse direction, or in both the machine direction and the transverse direction.

The density of fine surface protrusions may be controlled by adjusting in the coating solution the type of fine particles, the mean particle diameter of the fine particles, and the concentration of the solid fraction.

The mean diameter (D) and mean height (H) of the fine surface protrusions can be also controlled by adjusting in the coating solution the type of the fine particles, the mean diameter of the fine particles, and the concentration of the solid fraction. Furthermore, the mean diameter (D) and mean height (H) are controllable by selecting the glass transition temperature of the organic polymer and by adjusting the stretching temperature. The organic polymer particles may be flattened by increasing the diameter and decreasing the height by stretching the film at a temperature above the glass transition temperature after coating it with the coating solution. Consequently, the H/D ratio may be smaller than 1.0. The H/D ratio is further reduced as the difference between the glass transition temperature and stretching temperature increases.

The following method is effective for reducing the density of the fine surface protrusions with a height of 20 nm or more to 3,000 protrusions/mm$^2$, and for adjusting the surface roughness Ra of surface A in the range of 1 to 5 nm. The density, height, and diameter of the protrusions are controlled at first by adjusting the type of the fine particles, the mean diameter of the fine particles, and the concentration of the solid fraction in the coating solution. When the organic polymer particles are used as the fine particles in the coating layer, they have a mean particle diameter of 10 to 55 nm and a glass transition temperature of 0 to 90° C. The diameter of the organic polymer particles increases while their height is decreased as described above, by stretching at a temperature above the glass transition temperature of the organic polymer particles. In addition, the height of the fine surface protrusions may be reduced to 20 nm or less while adjusting the surface roughness Ra within a desired range. On the other hand, when inorganic particles are used for the fine particles, the inorganic particles which have a mean particle diameter of 5 to 10 nm are preferable. Since fine surface protrusions with a height of 20 nm or more are formed by cohesion of two or more inorganic particles with an excessive surface roughness Ra, it is important to prevent the particles from cohesion. Such cohesion is preferably prevented by charging the surface of the inorganic particles in order to generate repulsive forces among the particles. The pH value is adjusted in accordance with the surface potential of the fine particles so that the fine particles are repelled by each other. Otherwise, the aggregation speed of the fine particles may be reduced by increasing the viscosity of the coating solution. However, using the organic polymer particles is preferable in order to reliably control the surface protrusions.

Controlling the coating solution so that the fine particles are repelled by each other is effective for reducing the degree of cohesion of the fine surface protrusions in the coating solution to less than 15%. The viscosity and pH are recommended controlling factors for this purpose. For example, it is preferable to adjust the pH of the coating solution depending on the surface potential of the fine particles so that the fine particles are repelled by each other, or to increase the viscosity of the coating solution in order to decrease the coagulation speed of the fine particles.

An A/B melt-extrusion film may be formed by a co-extrusion technique. Preferably, the polyester as described above is used for the film material at the A-side of the surface, and a polyester containing more fine particles is used for the film material at the B-side of the surface. Surface B may be lubricated by coating it with a coating solution containing a lubricant, or co-extrusion and application of a coating solution containing the lubricant may be used together.

An example for producing the magnetic recording tape according to the invention will be then described below. A magnetic layer comprising Co is formed on the coating layer of surface A of the polyester film for magnetic recording media according to the present invention at a thickness of 20 to 70 nm by vacuum evaporation. A diamond-like carbon layer with a thickness of about 10 nm is coated on the magnetic layer, and the lubricant is further coated thereon. On the other hand, a back-coat layer is formed by applying a solution containing solid fine particles and a binder, and optionally containing various additives, on surface B. The magnetic recording tape is produced by cutting the polyester film with above-mentioned layers into tapes having a prescribed width.

The present invention will be further described with reference to examples.

The measuring methods used in the present invention are described below. For measuring the surface properties of the film on which the magnetic layer has been formed, the surface is measured by the following methods after removing the magnetic layer with chemical reagents such as hydrochloric acid.

(1) Surface Roughness of the Surface of the Film, Ra

The surface of the film was measured using an atomic force microscope (scanning probe microscope). Ra was determined by calculating the arithmetic average corresponding to Ra from the surface profile curve obtained according to JIS B0601 (the same as ISO 468-1982). The measured length L was extracted in the direction of a central line from each set of roughness curves constituting the profile curve. An X-axis was defined in the direction of the average line of the extracted curves, and a Y-axis was defined in the direction of vertical magnification. The roughness curve was represented by y=f(x), the values obtained by the equation below were represented in units of nanometers (nm), and Ra was calculated from the mean value against a number of the extracted roughness curves.

$$Ra = \frac{1}{L}\int_0^L |f(x)|dx$$

The measured area was in the range of 4 μm square, the magnification in the plane was 10,000 to 50,000, and the magnification in the height direction was 1,000,000.

(2) Degree of Cohesion of Fine Surface Protrusions on the Surface of the Film

Ten or more fields of vision of the surface of the film were observed under a scanning electron microscope with a magnification of 50,000. When a surface protrusion is in contact with another protrusion, or when other protrusions lie within a distance of 1/10 of the principal axis of a protrusion, these protrusions were considered to be grouped together. The degree of cohesion (%) was determined by dividing the number of grouped protrusions by the total number of protrusions.

(3) Density of the Fine Surface Protrusions with a Height of 20 mm or More on the Surface of the Film The density of the surface protrusions with a height of 20 nm or more on the surface of the film was measured using an atomic force microscope (scanning probe microscope). The surface of the film was scanned with the atomic force microscope within a range of 40 μm square on the surface of the film in a dumping mode using a small probe microscope (Nanopics 1000) made by Seiko Instruments Co. A Z-direction cross-sectional chart was drawn from a surface profile curve obtained. The number of protrusions having a height of larger than 20 nm was determined under the assumption that the minimum height is 0 nm, and the number was converted into the number per 1 mm². The magnification in the plane direction was about 5,000, and the magnification in the height direction was about 1,000,000. A mean value was calculated from five measurements. The height that could be practically measured was about 100 nm.

(4) Density of Fine Surface Protrusions on the Surface of the Film

Ten or more fields of vision of the surface of the film were observed with the scanning electron microscope with a magnification of 50,000, and the number of protrusions whose figures look like projections was counted as the number of the protrusions per 1 mm².

(5) Mean Diameter (D) of Fine Surface Protrusions on the Surface of the Film

Five or more fields of vision of the surface of the film were observed under the scanning electron microscope with a magnification of 50,000. In each field 10 protrusions whose figures look like projections were randomly selected. The mean value of the maximum diameter and the minimum diameter of a selected protrusion was defined to be the diameter of the protrusion, and the mean diameter of the fine surface protrusions was calculated as the mean value of the diameter of 50 protrusions.

(6) Mean Height (H) of the Fine Surface Protrusions on the Surface of the Film

Ultra-thin slices of the surface of the film cut in the direction parallel to the longitudinal direction of the film were prepared, and each slice was observed under a transmission electron microscope (TEM with a magnification of 200,000). The distance from the interface between the film and coating layer to the tip of the fine surface protrusion was measured to determine the height of the fine surface protrusion. Actually, five ultra-thin slices were prepared, a TEM photograph was taken for each slice, and the mean height (H) of the fine surface protrusions was determined from the mean value of the heights of 10 to 20 protrusions.

(7) Evaluation of Properties of Magnetic Recording Tape

An image was recorded on a MICRO MV tape obtained in a quiet room using a commercially available MICRO MV video camera. The track pitch was 5 μm. The recorded image was reproduced for 1 minute at room temperature (25° C.), and the number of mosaic blocks was counted to determine the incidence of dropouts (referred to as DO hereinafter). Tapes having a smaller incidence of DO were evaluated to be magnetic recording tapes having superior properties.

Reproduction of the tape was repeated 200 times over the entire length of the tape, and the incidence of DO in the 200th reproduction was measured. The traveling durability of the MICRO MV tape was evaluated from the changes in the incidence of DO between the first reproduction and the 200th reproduction. After the 200 times of reproduction, the MR head was observed under the scanning electron microscope to evaluate the effect of wear on the reproduction head.

EXAMPLE 1

A polyethylene terephthalate material A substantially containing no inert particles and a material B containing 0.20% by weight of aluminum silicate with a mean particle diameter of 300 nm in the same kind of polyethylene terephthalate as material A were co-extruded in a thickness ratio of 5:1, and the extruded film was adhered on a cooling drum to obtain a laminated film. Hereinafter, the surface at the material A side and the surface at the material B side are called surface A and surface B, respectively. The film obtained was stretched in the machine direction by roll stretching to a stretching ratio of 3.0 at 110° C.

An aqueous solution with the following composition was applied on surface A of the film in an amount, in terms of the solid fraction in the coating, of 20 mg/m² in the step after the stretching step.

| Aqueous coating solution on surface A (overall pH = 8.1) | |
|---|---|
| Methyl cellulose: | 0.12% by weight |
| Water soluble polyester (a 1:1 copolymer of an acidic component comprising 70 mol % of terephthalic acid and 30 mol % of sodium 5-sulfoisophthalic acid, and ethylene glycol) | 0.33% by weight |
| Silicone modified with amino group | 0.010% by weight |
| Polystyrene spherical particles with a mean particle diameter of 33 nm (glass transition temperature: 107° C., an emulsion with a solid fraction of 10% by weight, pH 7.8) | 0.03% by weight |

The film was stretched in the transverse direction with a stretching ratio of 4.2 at 110° C. using a stenter, heat-set at 215° C., and then wound onto an intermediate spool thereafter. Then, the film was slit into a film with a small width using a slitter, thereby obtaining a polyester film for magnetic recording media with a thickness of 6.3 μm.

A thin cobalt-oxygen layer with a thickness of 50 nm was deposited on surface A of the polyester film for magnetic recording media by vacuum evaporation. Then, a layer of diamond-like carbon was formed on the thin cobalt-oxygen layer at a thickness of 10 nm by sputtering. Then, a lubricant of a fluorine containing fatty acid ester was applied to the diamond-like carbon layer at a thickness of 3 nm. Subsequently, a back-coat layer comprising carbon black, polyurethane, and silicone was formed at a thickness of 500 nm on surface B. The film was slit into a width of 3.8 mm using a slitter, and the tape was wound on a reel to prepare a magnetic recording tape (MICRO MV tape).

The properties of the polyester film for magnetic recording media and the magnetic recording tape obtained are shown in Table 1. The surface roughness Ra of surface B of the polyester film for magnetic recording media was 20 nm. After 200 times of reproduction of the magnetic recording tape, the reproduction head of the MICRO MV video camera was observed, and it was found that the MR thin layer on the surface of the head was not worn at all.

EXAMPLE 2

A polyester film for magnetic recording media with a thickness of 6.3 μm was produced by the same method as in Example 1, except that the polystyrene spherical particles in the aqueous coating solution were changed to polymethylmethacrylate spherical particles (glass transition temperature: 118° C., solid fraction 40% by weight, emulsion with pH of 5.6), the pH value of the entire aqueous coating solution was adjusted to pH 5.6, and the temperature for stretching in the transverse direction was changed to 122° C. A magnetic recording tape (MICRO MV tape) with a width of 3.8 mm was produced from the film. The properties of the polyester film for magnetic recording media and the magnetic recording tape obtained are shown in Table 1. The Ra value of surface B of the polyester film for magnetic recording media was 20 nm. After 200 times of reproduction of the magnetic recording tape, the reproduction head of the MICRO MV video camera was observed, and it was found that the MR thin layer on the surface of the head was not worn at all.

EXAMPLE 3

A polyester film for magnetic recording media with a thickness of 4.8 μm was produced by the same method as in Examples 1, except that the polyethylene terephthalate was changed to polyethylene-2,6-naphthalate, the content of aluminum silicate in the material B was changed to 1.1% by weight, the temperature and stretching ratio in the stretching step in the machine direction were changed to 135° C. and 5.0, respectively, the amount of coating, in terms of the solid fraction, was changed to 50 mg/M$^2$, the temperature and stretching ratio in the stretching step in the transverse direction were changed to 135° C. and 6.5, respectively, and the heat treatment was applied at 200° C. A magnetic recording tape (MICRO MV tape) with a width of 3.8 mm was produced from the obtained polyester film for magnetic recording media. The properties of the polyester film for the magnetic recording media and the magnetic recording tape obtained are shown in Table 1. The Ra value of surface B of the polyester film for the magnetic recording media was 22 nm. After 200 times of reproduction of the magnetic recording tape, the reproduction head of the MICRO MV video camera was observed, and it was found that the MR thin layer on the surface of the head was not worn at all.

EXAMPLE 4

A polyester film for magnetic recording media with a thickness of 6.3 μm was produced by the same method as in Example 1, except that the amount of coating, in terms of the solid fraction, was changed to 6 mg/m$^2$. A magnetic recording tape (MICRO MV tape) with a width of 3.8 mm was produced from the film. The properties of the polyester film for magnetic recording media and the magnetic recording tape are shown in Table 1. The Ra value of surface B of the polyester film for magnetic recording media was 20 nm. After 200 times of reproduction of the magnetic recording tape, the reproduction head of the MICRO MV video camera was observed, and it was found that the MR thin layer on the surface of the head was slightly worn.

EXAMPLE 5

A polyester film for magnetic recording media with a thickness of 6.3 μm was produced by the same method as in Example 1, except that the mean particle diameter of the polystyrene spherical particles in the aqueous coating solution was changed to 14 nm, and the stretching temperature for stretching in the transverse direction was changed to 102° C. A magnetic recording tape (MICRO MV tape) with a width of 3.8 mm was produced from the film. The properties of the polyester film for magnetic recording media and the magnetic recording tape are shown in Table 1. The Ra value of surface B of the polyester film for magnetic recording media was 20 nm. After 200 times of reproduction of the magnetic recording tape, the reproduction head of the MICRO MV video camera was observed, and it was found that the MR thin layer on the surface of the head was slightly worn.

EXAMPLE 6

A polyester film for magnetic recording media with a thickness of 6.3 μm was produced by the same method as in Example 1, except that the mean particle diameter of polystyrene spherical particles in the aqueous coating solution was changed to 10 nm. A magnetic recording tape (MICRO MV tape) with a width of 3.8 mm was produced from the film. The properties of the polyester film for magnetic recording media and the magnetic recording tape are shown in Table 1. The Ra value of surface B of the polyester film for magnetic recording media was 20 nm. After 200 times of reproduction of the magnetic recording tape, the reproduction head of the MICRO MV video camera was observed, and it was found that the MR thin layer on the surface of the head was a little worn.

EXAMPLE 7

A polyethylene terephthalate material A substantially containing no inert particles, and a material B containing 0.20% by weight of aluminum silicate with a mean particle diameter of 300 nm in the same kind of polyethylene terephthalate as material A were co-extruded in a thickness ratio of 5:1, and the extruded film was adhered on a cooling drum to obtain a laminated film. The sheet was stretched in the machine direction by roll stretching to a stretching ratio of 3.0 at 110° C.

An aqueous solution with the following composition was applied to surface A of the film in an amount of coating, in terms of the solid fraction, of 20 mg/m$^2$ in the step after the stretching step.

| Aqueous coating solution on surface A (overall pH = 4.5) | |
|---|---|
| Methyl cellulose: | 0.10% by weight |
| Water soluble polyester (a 1:1 copolymer of an acidic component comprising 70 mol % of terephthalic acid and 30 mol % of sodium 5-sulfoisophthalic acid, and ethylene glycol) | 0.33% by weight |
| Silicone modified with amino group | 0.010% by weight |
| Superfine silica with a mean diameter of 8 nm | 0.005% by weight |

The film was stretched in the transverse direction to a stretching ratio of 4.2 at 110° C. using a stenter, heat-set at 215° C., and then wound on an intermediate spool. Then, the film was slit into a film with a small width using a slitter and wound on a cylindrical core as a roll, thereby obtaining a polyester film for magnetic recording media with a thickness of 6.3 μm.

A thin cobalt-oxygen layer with a thickness of 50 nm was deposited on surface A of the polyester film for magnetic recording media by vacuum evaporation. Then, a layer of diamond-like carbon was formed on the thin cobalt-oxygen layer at a thickness of 10 nm by sputtering. Then, a lubricant of a fluorine containing fatty acid ester was applied to the diamond-like carbon layer at a thickness of 3 nm. Subsequently, a back-coat layer comprising carbon black, polyurethane, and silicone was formed at a thickness of 500 nm on surface B. The film was slit into a width of 3.8 mm using a slitter, and the tape was wound onto a reel to prepare a magnetic recording tape (MICRO MV tape).

The properties of the polyester film for magnetic recording media and the magnetic recording tape obtained are shown in Table 1. The surface roughness Ra of surface B of the polyester tape for magnetic recording media was 20 nm. After 200 times of reproduction of the magnetic recording tape, the reproduction head of the MICRO MV video camera was observed, and it was found that the MR thin layer on the surface of the head was not worn at all.

EXAMPLE 8

A polyester film for magnetic recording media with a thickness of 6.3 μm was produced by the same method as in Example 7, except that the superfine silica in the aqueous coating solution was changed to 0.03% by weight of polystyrene spherical particles (glass transition temperature: 107° C., solid fraction 10% by weight, emulsion with pH of 7.8), and the pH value of the entire aqueous coating solution was adjusted to pH 8.0. A magnetic recording tape (MICRO MV tape) with a width of 3.8 mm was produced from the film. The properties of the polyester film for magnetic recording media and the magnetic recording tape are shown in Table 1. The Ra value of surface B of the polyester film for magnetic recording media was 20 nm. After 200 times of reproduction of the magnetic recording tape, the reproduction head of the MICRO MV video camera was observed, and it was found that the MR thin layer on the surface of the head was not worn at all.

EXAMPLE 9

A polyester film for magnetic recording media with a thickness of 6.3 μm was produced by the same method as in Example 8, except that the polystyrene spherical particles on the aqueous coating solution were changed to polymethyl methacrylate spherical particles (glass transition temperature 118° C., solid fraction 40% by weight, emulsion with pH of 5.6) with a mean particle diameter of 50 nm, the pH value of the entire aqueous coating solution was changed to 5.0, and the temperature for stretching in the transverse direction was changed to 122° C. A magnetic recording tape (MICRO MV tape) with a width of 3.8 mm was produced from the film. The properties of the obtained polyester film for magnetic recording media and the magnetic recording tape are shown in Table 1. The Ra value of surface B of the polyester film for magnetic recording media was 20 nm. After 200 times of reproduction of the magnetic recording tape, the reproduction head of the MICRO MV video camera was observed, and it was found that the MR thin layer on the surface of the head was not worn at all.

EXAMPLE 10

A polyester film roll for magnetic recording media with a thickness of 4.8 μm was produced by the same method as in Example 7, except that the polyethylene terephthalate was changed to polyethylene-2,6-naphthalate, the content of aluminum silicate in the material B was changed to 1.1% by weight, the temperature and stretching ratio in the stretching step in the machine direction were changed to 135° C. and 5.0, respectively, the amount of coating of the solid fraction was changed to 50 mg/m², the temperature and stretching ratio in the transverse stretching step was changed to 135° C. and 6.5, and the heat treatment temperature was changed to 200° C. A magnetic recording tape (MICRO MV tape) with a width of 3.8 mm was produced from the polyester film for magnetic recording media. The properties of the obtained polyester film for magnetic recording media and the magnetic recording tape are shown in Table 1. The Ra value of surface B of the polyester film for magnetic recording media was 22 nm. After 200 times of reproduction of the magnetic recording tape, the reproduction head of the MICRO MV video camera was observed, and it was found that the MR thin layer on the surface of the head was not worn at all.

COMPARATIVE EXAMPLE 1

A polyester film roll for magnetic recording media with a thickness of 6.3 μm was produced by the same method as in Example 1, except that the amount of coating of the solid fraction was changed to 90 mg/m², and the concentration of the polystyrene spherical particles was changed to 0.10% by weight. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm.

COMPARATIVE EXAMPLE 2

A polyester film for magnetic recording media with a thickness of 6.3 μm was produced by the same method as in Example 1, except that the mean particle diameter of the polystyrene spherical particles in the aqueous coating solution was changed to 90 nm. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm.

COMPARATIVE EXAMPLE 3

A polyester film for magnetic recording media with a thickness of 6.3 μm was produced by the same method as in Example 1, except that the polystyrene spherical particles in the aqueous coating solution were changed to superfine silica particles with a mean particle diameter of 20 nm. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm. After 200 times of reproduction of the magnetic recording tape, the reproduction head of the MICRO MV camera was observed, and it was found that the MR head on the surface of the head was worn.

COMPARATIVE EXAMPLE 4

A polyester film for magnetic recording media with a thickness of 6.3 μm was produced by the same method as in Example 1, except that the mean particle diameter of the polystyrene spherical particles in the aqueous coating solution was changed 60 nm. A magnetic recording tape with a width of 6.35 mm was manufactured from the film. The properties of the polyester film for magnetic recording media and the magnetic recording tape obtained are shown in Table 1. The Ra value of surface B of the polyester film for magnetic recording media was 20 nm.

COMPARATIVE EXAMPLE 5

A polyester film for magnetic recording media with a thickness of 6.3 μm was produced by the same method as in Example 1, except that the pH value of the aqueous coating solution was changed to 6.5. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm. After 200 times of reproduction of the magnetic recording tape, the reproduction head of the MICRO MV camera was observed, and it was found that the MR head on the surface of the head was worn.

COMPARATIVE EXAMPLE 6

A polyester film for magnetic recording media with a thickness of 6.3 μm was produced by the same method as in Example 7, except that the amount of coating of the solid fraction was changed to 6 mg/m² in the aqueous coating solution. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm. After 200 times of reproduction of the magnetic recording tape, the reproduction head of the MICRO MV camera was observed, and it was found that the MR head on the surface of the head was worn.

COMPARATIVE EXAMPLE 7

A polyester film for magnetic recording media with a thickness of 6.3 μm was produced by the same method as in Example 7, except that the amount of coating, in terms of the solid fraction, was changed to 95 mg/m², and the concentration of the polystyrene spherical particles was changed to 0.10% by weight. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm.

COMPARATIVE EXAMPLE 8

A polyester film for magnetic recording media with a thickness of 6.3 μm was produced by the same method as in Example 8, except that the mean particle diameter of the polystyrene spherical particles in the aqueous coating solution was changed to 90 nm. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm.

COMPARATIVE EXAMPLE 9

A polyester film for magnetic recording media with a thickness of 6.3 μm was produced by the same method as in Example 7, except that the mean particle diameter of the superfine silica in the aqueous coating solution was changed to 4 nm, and the stretching temperature for stretching in the transverse direction was changed to 102° C. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm. After 200 times of reproduction of the magnetic recording tape, the reproduction head of the MICRO MV camera was observed, and it was found that the MR head on the surface of the head was worn.

COMPARATIVE EXAMPLE 10

A polyester film for magnetic recording media with a thickness of 6.3 μm was produced by the same method as in Example 7, except that the mean particle diameter of the superfine silica in the aqueous coating solution was changed to 18 nm. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm. After 200 times of reproduction of the magnetic recording tape, the reproduction head of the MICRO MV camera was observed, and it was found that the MR head on the surface of the head was a little worn.

COMPARATIVE EXAMPLE 11

A polyester film for magnetic recording media with a thickness of 6.3 μm was produced by the same method as in Example 8, except that the stretching temperature for stretching in the transverse direction was changed to 103° C. A magnetic recording tape (MICRO MV tape) with a width of 3.8 mm was manufactured from the film. The properties of the polyester film for magnetic recording media and the magnetic recording tape obtained are shown in Table 1. The Ra value of surface B of the polyester film for magnetic recording media was 20 nm.

TABLE 1

| | SURFACE PROPERTIES OF POLYESTER FILM | | | | | PROPERTIES OF MAGNETIC RECORDING TAPE No. OF DO/MIN | |
|---|---|---|---|---|---|---|---|
| | FINE SURFACE PROTRUSIONS | | | | DENSITY OF | | |
| | PROTRUSIONS/ mm² | DIAMETER D (nm) | HEIGHT H (nm) | DEGREE OF COHESION (%) | SURFACE ROUGHNESS Ra (nm) | PROTRUSIONS WITH HEIGHT OF 20 nm OR MORE/mm² | INITIAL | AT 200-TH REPRODUCTION |
| EXAMPLE 1 | $3.2 \times 10^7$ | 40 | 20 | 0.3 | 2.2 | — | 0 | 0 |
| EXAMPLE 2 | $3.9 \times 10^7$ | 32 | 25 | 1.3 | 2 | — | 0 | 0 |
| EXAMPLE 3 | $3.0 \times 10^7$ | 42 | 15 | 3.5 | 2.6 | — | 0 | 0 |
| EXAMPLE 4 | $3.0 \times 10^6$ | 40 | 20 | 0.3 | 0.8 | — | 0 | 10 |
| EXAMPLE 5 | $3.3 \times 10^7$ | 14 | 12 | 13.5 | 2.1 | — | 0 | 14 |
| EXAMPLE 6 | $3.2 \times 10^7$ | 15 | 8 | 2.6 | 2 | — | 0 | 20 |

TABLE 1-continued

| | SURFACE PROPERTIES OF POLYESTER FILM | | | | | PROPERTIES OF MAGNETIC RECORDING TAPE No. OF DO/MIN | |
|---|---|---|---|---|---|---|---|
| | FINE SURFACE PROTRUSIONS | | | | DENSITY OF | | |
| | PROTRUSIONS/ $mm^2$ | DIAMETER D (nm) | HEIGHT H (nm) | DEGREE OF COHESION (%) | SURFACE ROUGHNESS Ra (nm) | PROTRUSIONS WITH HEIGHT OF 20 nm OR MORE/$mm^2$ | INITIAL | AT 200-TH REPRODUCTION |
| EXAMPLE 7 | $9.0 \times 10^6$ | 8 | — | — | 1.5 | 600 | 0 | 0 |
| EXAMPLE 8 | $5.0 \times 10^7$ | 30 | — | — | 2 | 0 | 0 | 0 |
| EXAMPLE 9 | $3.0 \times 10^7$ | 58 | — | — | 3.1 | 600 | 0 | 0 |
| EXAMPLE 10 | $1.0 \times 10^7$ | 8 | — | — | 1.5 | 600 | 0 | 0 |
| COMPARATIVE EXAMPLE 1 | $1.22 \times 10^8$ | 42 | 22 | 4.3 | 6 | — | 18 | 19 |
| COMPARATIVE EXAMPLE 2 | $3.3 \times 10^7$ | 140 | 28 | 2.3 | 3.7 | — | 21 | 22 |
| COMPARATIVE EXAMPLE 3 | $4.0 \times 10^7$ | 20 | 18 | 32.3 | 5.3 | — | 30 | 95 |
| COMPARATIVE EXAMPLE 4 | $3.1 \times 10^7$ | 80 | 35 | 0.8 | 4 | — | 30 | 30 |
| COMPARATIVE EXAMPLE 5 | $3.2 \times 10^7$ | 30 | 20 | 15.3 | 4.3 | — | 0 | 85 |
| COMPARATIVE EXAMPLE 6 | $1.5 \times 10^6$ | 8 | — | — | 0.7 | 0 | 0 | 30 |
| COMPARATIVE EXAMPLE 7 | $1.5 \times 10^8$ | 8 | — | — | 3.6 | 2900 | 40 | 40 |
| COMPARATIVE EXAMPLE 8 | $3.0 \times 10^6$ | 100 | — | — | 5.7 | 2000 | 50 | 50 |
| COMPARATIVE EXAMPLE 9 | $9.0 \times 10^6$ | 4 | — | — | 1.2 | 600 | 0 | 35 |
| COMPARATIVE EXAMPLE 10 | $4.0 \times 10^6$ | 18 | — | — | 1.9 | 5800 | 20 | 40 |
| COMPARATIVE EXAMPLE 11 | $5.0 \times 10^7$ | 27 | — | — | 3 | 9000 | 80 | 80 |

The properties described in Table 1 show that the magnetic recording tape (MICRO MV tape) produced using the polyester film for magnetic recording media according to the invention has a low incidence of dropout, reduced wear of the MR head during reproduction, and good traveling durability.

The present invention provides a magnetic recording tape with substantially no wear of the MR head and low incidence of dropouts while maintaining excellent traveling durability, and a polyester film for magnetic recording media that enables such a magnetic recording tape to be manufactured. The magnetic recording tape according to the present invention is suitable for use as the magnetic recording tape for digital recorders using an MR head as a reproduction head. A digital recorder using the magnetic recording tape according to the invention is particularly suitable as a digital video recorder and data storage device. A digital recorder using the magnetic recording tape of the present invention is able to give a good image quality with low incidence of dropouts, even when the magnetic recording tape is used for a MV digital video recorder in which the image is recorded on the magnetic recording tape at a very high recording density with a 6 μm track pitch, and is reproduced with the MR head. The magnetic recording tape does not adversely affect the service life of the MR head, and maintains with good traveling durability, and the image is not deteriorated by repeated use of the tape.

What is claimed is:

1. A magnetic digital recorder comprising at least a reproduction head and magnetic recording tape, wherein an MR head is used for the reproduction head, and the magnetic recording tape comprising a coating layer containing fine particles and organic compounds and having a surface A formed on one side of a polyester film, fine surface protrusions being formed at a density of $5 \times 10^6$ to $9 \times 10^7$ protrusions/$mm^2$ on surface A, the polyester film satisfying the following conditions:
   (1) the mean diameter of the fine surface protrusions is in the range of 20 to 100 nm,
   (2) the mean height of the fine surface protrusions is in the range of 10 to 30 nm, and
   (3) the degree of cohesion of the fine surface protrusions is less than 5%, wherein a ferromagnetic metal thin layer is formed on surface A.

2. A magnetic digital recorder according to claim 1 wherein the thickness of the ferromagnetic metal thin layer is 20 to 70 nm.

3. The digital recorder according to claim 1 using a digital recording method with a track pitch of 6 mm or less.

4. The digital recorder according to claim 2 using a digital recording method with a track pitch of 6 μm or less.

* * * * *